US011345848B2

(12) United States Patent
Khamatnurova et al.

(10) Patent No.: US 11,345,848 B2
(45) Date of Patent: May 31, 2022

(54) BINDING COMPOSITION FOR PROPPANT

(71) Applicant: HALLIBURTON ENERGY SERVICES, INC., Houston, TX (US)

(72) Inventors: Tatyana Khamatnurova, Houston, TX (US); Walter T. Stephens, Houston, TX (US); Philip D. Nguyen, Houston, TX (US); Gladys Rocio Montenegro-Galindo, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/485,747

(22) PCT Filed: Mar. 6, 2017

(86) PCT No.: PCT/US2017/020991
§ 371 (c)(1),
(2) Date: Aug. 13, 2019

(87) PCT Pub. No.: WO2018/164663
PCT Pub. Date: Sep. 13, 2018

(65) Prior Publication Data
US 2020/0017759 A1 Jan. 16, 2020

(51) Int. Cl.
*E21B 43/16* (2006.01)
*C09K 8/80* (2006.01)
*C09K 8/84* (2006.01)

(52) U.S. Cl.
CPC ............ *C09K 8/805* (2013.01); *C09K 8/845* (2013.01); *E21B 43/16* (2013.01)

(58) Field of Classification Search
CPC ......... C09K 8/805; C09K 8/845; E21B 43/23; E21B 43/16
See application file for complete search history.

(56) References Cited

U.S. PATENT DOCUMENTS

| 4,844,831 A | 7/1989 | Joubert et al. |
| 6,409,819 B1 | 6/2002 | Ko |

(Continued)

FOREIGN PATENT DOCUMENTS

| WO | 9211327 A1 | 7/1992 |
| WO | 2016032417 A1 | 3/2016 |

OTHER PUBLICATIONS

Palomo, A. et al.; "Alkali-activated fly ashes A cement for the future", Cement and Concrete Research 29 (1999) 1323-1329.

(Continued)

*Primary Examiner* — Silvana C Runyan
(74) *Attorney, Agent, or Firm* — Polsinelli PC

(57) ABSTRACT

A downhole treatment fluid made up of a binding composition and a proppant, the binding composition including an aluminosilicate source, a metal silicate, an alkali metal activator. The binding composition may form a coated particulate or an aggregate with the proppant and provides strength-enhancing properties. The binding composition has easy handling properties facilitating on-the-fly preparation and downhole injection procedures. Furthermore, the binding composition has a low strength-hardening temperature and so may strength-harden in the presence of downhole temperatures.

20 Claims, 2 Drawing Sheets

(56) References Cited

U.S. PATENT DOCUMENTS

| | | |
|---|---|---|
| 6,572,698 B1 | 6/2003 | Ko |
| 8,809,231 B2 | 8/2014 | Liu et al. |
| 9,394,202 B2 | 7/2016 | Porcherie et al. |
| 2006/0100342 A1 | 5/2006 | Jensen |
| 2008/0028994 A1* | 2/2008 | Barlet-Gouedard ... C09K 8/467 106/811 |
| 2010/0032159 A1 | 2/2010 | Saini et al. |
| 2010/0330380 A1 | 12/2010 | Colreavy et al. |
| 2011/0284223 A1* | 11/2011 | Porcherie ............. C04B 28/006 166/292 |
| 2012/0157358 A1 | 6/2012 | Fang et al. |
| 2013/0233623 A1 | 9/2013 | Aston et al. |
| 2014/0026787 A1* | 1/2014 | Amritphale ......... C04B 22/0006 106/697 |
| 2015/0083414 A1 | 3/2015 | Monroe et al. |
| 2015/0114640 A1 | 4/2015 | Bestaoui-Spurr et al. |
| 2016/0153274 A1* | 6/2016 | Hull ...................... E21B 43/267 166/280.2 |
| 2016/0215208 A1 | 7/2016 | Monastiriotis et al. |
| 2017/0183562 A1* | 6/2017 | Nguyen ................ E21B 43/267 |

OTHER PUBLICATIONS

Motorwala, Ammar et al.; "ALKALI Activated FLY-ASH Based Geopolymer Concrete", International Journal of Emerging Technology and Advanced Engineering; Website: www.ijetae.com (ISSN 2250-2459, ISO 9001:2008 Certified Journal, vol. 3, Issue 1, Jan. 2013).

International Search Report and Written Opinion; PCT Application No. PCT/US2017/020991; dated Dec. 26, 2017.

* cited by examiner

BINDING COMPOSITION FOR PROPPANT

CROSS-REFERENCE TO RELATED APPLICATIONS

This application is a national stage entry of PCT/US2017/020991 filed Mar. 6, 2017, said application is expressly incorporated herein in its entirety.

FIELD

The present disclosure relates to treatment fluids for use in subterranean wellbores. In particular, the present disclosure relates to a strength-enhancing binder composition for proppants, its preparation and use.

BACKGROUND

During various processes in the stimulation and production of hydrocarbons, it is often necessary to deliver components to various subterranean zones within the wellbore. One of the major processes involves fracturing treatments for wellbore stimulation. In a typical hydraulic fracturing treatment, a carrier fluid often referred to as a "fracturing fluid" is pumped through a wellbore and into a subterranean formation producing zone at a rate and pressure such that one or more fractures are formed or extended into the zone. The fracturing fluid can include proppants which are introduced into the fractures.

The proppants "prop" the fractures open, thereby enhancing the ability of fluids to migrate from the formation to the well bore through the fracture. The proppants maintain the size of the fractures so as to create or maintain conductive channels in a subterranean formation. Conductivity refers to the ability of the formation to pass fluid through the fractures to and from the wellbore.

BRIEF DESCRIPTION OF THE DRAWINGS

Implementations of the present technology will now be described, by way of example only, with reference to the attached figures, wherein.

DETAILED DESCRIPTION

Figure 1:
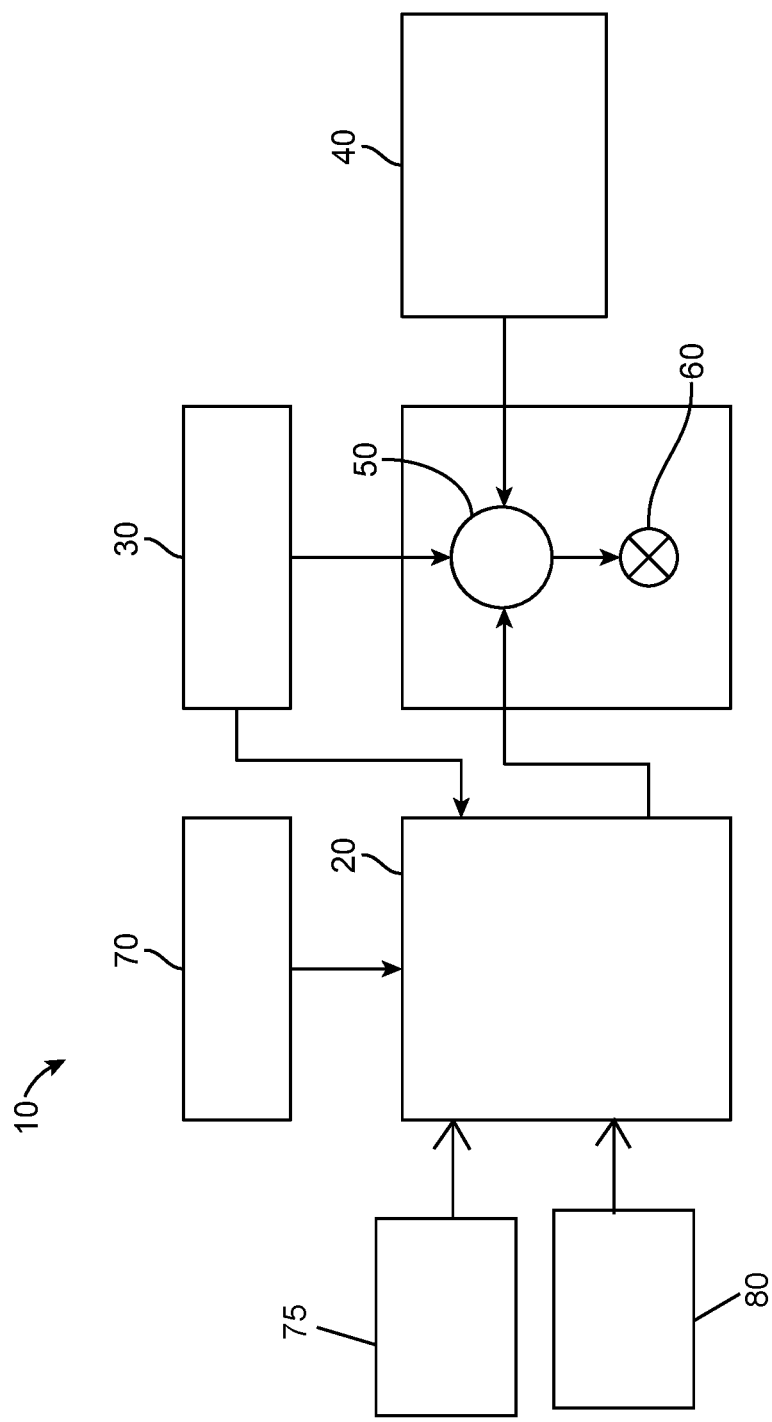
FIG. 1 is a diagram illustrating an example of a fracturing system that may be used in association with certain aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

In the following discussion and in the claims, the terms "including" and "comprising" are used in an open-ended fashion, and thus should be interpreted to mean "including, but not limited to . . . ". As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Overview

The present disclosure is directed to a downhole treatment fluid made up of a binding composition which is mixed with a proppant to form a coated proppant particle or an aggregate with a plurality of proppants. The binding composition may include (a) an aluminosilicate source, (b) a metal silicate, (c) an alkali metal activator, and (d) an aqueous base fluid. The binding composition provides strength-enhancing properties thereby causing the proppant to better prop open fractures downhole as well as to improve conductivity. The binding composition undergoes a strength-hardening process defined herein as involving one or more of curing, sintering or geopolymerization, wherein a strength-enhancing phase change occurs in at least a portion of the binding composition, and which may occur in the presence or absence of an external heat source. The phase change may be such that the final state, as compared to its initial state, is a strength-hardened composition, having an increased proportion of one or more strength-enhancing phases in the composition such as, but not limited, to mullite.

It has been surprisingly found that the binding composition disclosed herein has low strength-hardening temperatures, and may undergo strength-hardening even in the absence of an external heat source.

The binding composition is initially flowable, and so facilitates easy handling and use. The binding composition may be prepared, then mixed with the proppant at the surface as a slurry, and then introduced downhole to flow into various fractures. Upon exposure to downhole temperatures, the binding composition strength-hardens to form a high strength coated particulate and/or a strength-hardened aggregate of a plurality of proppants. These beneficial properties permit the binding material to be mixed with proppant on-the-fly and injected into created fracture(s) to form highly conductive flow paths for improved well production.

The following provides more details regarding the disclosure herein, first discussing the binding composition, the proppant, and the process for making and using.

Binding Composition

Aluminosilicate Source

The binding composition includes an aluminosilicate source which may serve as a base component of the binding composition. This aluminosilicate source may be an inorganic material such as a cementitious material, or any alkali-activated inorganic material. The aluminosilicate source component may be synthetic or natural, and may include any material comprising aluminum and silicon which is or produces an aluminosilicate, an aluminum oxide, and/or a silicate. Particular aluminosilicate sources may include one or more of fly ash, slag, blast furnace slag, natural or calcined clay, natural or calcined bauxites, calcium carbonate, magnesium carbonates, marl, natural or synthetic ceramics, glass, kaolin, metakaolin, zeolite, scoria, allophone, bentonite, pumice, shale, naturally occurring geologic materials, industrial by-products, and the like. The aluminosilicates, including the industrial by-products, may have an $Al_2O_3$ content of greater than 5% by weight, alternatively, greater than 10% by weight, alternatively greater than 15% by weight of the aluminosilicate source component.

The aluminosilicate source may have a crystalline phase and an amorphous phase.

The amorphous phase prior to any strength-hardening (e.g., via sintering, curing, or geopolymerization etc.), may range from about 5 to about 95%, alternatively from about 30 to about 90%, alternatively from about 60 to about 80%, encompassing any value and subset therebetween. The crystalline phase may be the remainder of the aforementioned ranges or a portion thereof, and may range from about 5% to about 95%, alternatively from about 10% to about 70%, alternatively from 20% to 40% and encompassing any value and subset therebetween.

The aluminosilicate source may be microsized particulates. The particulates may include particles, spheres, microspheres, hollow microspheres, dust, or the like, in any shape. The aluminosilicate source may have a particle size less than that of the proppant, or a particle size may have a d50 less than that of the proppant. The particle size may be less than about 100 μm. In particular, the particle size may have a d50 of less than 100 μm, alternatively less than 80 μm, alternatively, the d50 may range from about 1 to about 100 μm, alternatively from about 5 to about 100 μm, alternatively from about 5 to about 50 μm, alternatively from about 10 μm to about 40 μm encompassing any value and subset therebetween.

The aluminosilicate source particles may have a density ranging from about 1 to about 5 g/cc, alternatively from 2 to about 4 g/cc, alternatively from 2 to about 3 g/cc, encompassing any value and subset therebetween.

Commercially available aluminosilicate sources include Zeospheres® N-600 ceramic microspheres, fly ash, clay materials, or any other minerals containing aluminum oxide and silica dioxide.

Metal Silicate

A metal silicate may be added to assist in the strength-hardening process of the binding composition. The metal in the metal silicate may be an alkali or alkaline earth metal, selected from groups 1 or 2 of the periodic table. A particular suitable metal includes sodium. Suitable metal silicates include potassium silicate, lithium silicate or other silicates. Particular metal silicates include sodium silicate, such as sodium metasilicate (also referred to as waterglass or liquid glass). A commercially available metal silicate includes Econolite™ sold by Halliburton Energy Services, Inc.

Alkali Metal Activator

The binding composition is activated by an alkali metal activator. The reaction which occurs to generate the chemical change in the binding composition is a kinetically favored reaction in the presence of the counterion donated by the alkali metal activator. The alkali metal activator, as used herein, includes alkali and alkaline earth compounds. The alkali metal activator may be a soluble base and may increase the pH of the binding composition. Alkali metal activators may be silicates, hydroxides, oxides, chlorides, carbonates, and phosphates. Particular of alkali metal activators include $Na_2O$, $K_2O$, KOH, NaOH, $Ca(OH)_2$, $Ba(OH)_2$, CsOH, $Sr(OH)_2$, $Mg(OH)_2$, LiOH, RbOH, $Na_2O$, $Li_2CO_3$, $Na_2CO_3$, $K_2CO_3$, $Rb_2CO_3$, $Cs_2CO_3$, $BeCO_3$, $CaCO_3$, $MgCO_3$, $SrCO_3$, or $BaCO_3$, $Na_2CO_3$, $KHCO_3$, $NaHCO_3$, KCl, NaCl, KF, NaF, or $MgCl_2$ or combinations thereof. Particular metal counterions are selected from $Na^+$, $K^+$, $Ca^{2+}$, and mixtures thereof. A commercially available alkali metal activator includes MO-67™ pH control agent, sold by Halliburton Energy Services, Inc., which contains NaOH as a component.

Base Fluid

The binding composition may include an aqueous base fluid. The aqueous base fluid includes water, deionized water, water with trace elements, saltwater, seawater, brine, freshwater, and the like. The brine may be filtered brine or "clear brine." Brines may include water soluble salts. Brines that may be used include monovalent or bivalent salts, and may include salts having for example alkali metals or alkaline earth metals. Particular salts which may be suitable include $CaCl_2$, $CaBr_2$, NaBr, $ZnBr_2$, NaCl, KCl, ZnBr, $NH_4Cl$, cesium formate, potassium formate, sodium formate, and mixtures thereof. The aqueous base fluid may contain, naturally or added, salts which act as the aforementioned alkali metal activator. The alkali metal activator may be added to the aqueous base fluid or may be obtained pre-dissolved in an aqueous base fluid.

Binder Composition Formation

The binder composition can be pre-made and brought to a worksite (e.g., the oilfield having the wellbore site to be operated upon), or can be made on-site. The binder composition can be mixed as it is with proppant and/or injected downhole. The binder composition may include the aluminosilicate source and the metal silicate in a ratio range of from about 1:10 to about 10:1, alternatively from about 1:4 to about 4:1, alternatively from about 3:7 to about 7:3, alternatively from alternatively from about 3:7 to about 7:3, alternatively from about 2:5 to about 5:2, alternatively about 1:1, encompassing any value and subset therebetween. The alkali metal activator can be present in the binding composition in a range of concentrations from 4 M to 16 M concentration. The amount of the alkaline solution can range from 10% to 50% for the total mixture.

Once mixed, the binding composition may undergo a morphological change and therefore thicken and harden over time even in the absence of an external heat source. The composition may be cured as a binding composition added with any material, such as a proppant, or may be cured by itself. Surprisingly, it has been found that the binding composition has a low strength-hardening temperature. The strength-hardening temperature may occur at room or atmospheric temperature. A thermal source may be required in which case the strength-hardening temperature may be from about 100° F. to about 400° F. Accordingly, strength-hardening may range from about 75° F. to about 500° F., alternatively from about 100° F. to about 400° F., alternatively from about 150° F. to about 350° F., alternatively from about 200° F. to about 250° F., encompassing any value and subset therebetween. The strength-hardening temperature may be about 400° F. or less, alternatively about 350° F. or less, alternatively about 300° F. or less, alternatively about 250° F. or less, encompassing any value and subset therebetween.

As mentioned, the binding composition may be formed into a strength-hardened composition, wherein the strength-hardened composition may be a geopolymer. Geopolymerization is a geosynthesis, a reaction process that may involve naturally occurring aluminosilicates. Geopolymers are a class of materials that are formed by chemical dissolution and subsequent recondensation of various aluminosilicates and silicates to form a 3D-network. Therefore, geopolymers are considered a three-dimensional mineral polymer. Geopolymers based on aluminosilicates are designed as poly (sialate), which is a shorter version of poly(silicon-oxo-aluminate). The sialate network consists of silicate and aluminate tetrahedrals linked alternately by sharing all oxygens, with $Al^{3+}$ and $Si^{4+}$ in IV-fold coordination with oxygen. M is a cation such as potassium, sodium or calcium, n is a degree of polymerization, and z is the atomic ratio of Si/Al.

A general reaction of the geopolymer composition is described in the following reaction

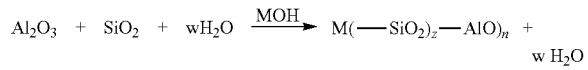

The product side of the reaction can also be disclosed as the following structure, to illustrate relative charges:

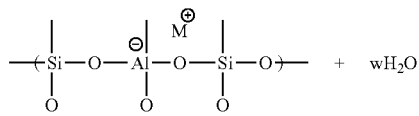

The above reaction is exemplary and may involve other or different reactions depending on the materials used as disclosed herein to form a strength-hardened composition.

The binding composition may be mixed or otherwise provided with a particulate substrate, such as a proppant to form a treatment fluid. The binding composition may form a coated particulate or an aggregate with the proppant. Various proppants are described in the following.

Proppants

Illustrative proppants that may be used in conjunction with the instant disclosure include any hard particulate that may prop open a fracture downhole, including any fine or coarse solid particles, gravel, sand, desert sand, beach sand, brown sand, white sand, ceramic beads, glass beads, bauxite, sintered bauxite, sized calcium carbonate, ceramic, gravel, glass, polymer materials, polytetrafluoroethylene materials, nut shell pieces, walnut shell fragments, cured resinous particulates having nut shell pieces, seed shell pieces, cured resinous particulates having seed shell pieces, fruit pit pieces, cured resinous particulates having fruit pit pieces, wood, composite particulates, and any combination thereof. Suitable composite particulates may have a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof.

The proppant particles may be generally of a size such that formation particulate solids which migrate with produced fluids are prevented from being produced from the subterranean zone. Generally, the proppant particles have a size in the range of from about 2 to about 400 mesh, U.S. Sieve Series. In some cases, the proppant is graded sand having a particle size in the range of from about 10 to about 70 mesh, U.S. Sieve Series. Sand particle size distribution ranges may be one or more of 10-20 mesh, 20-40 mesh, 40-60 mesh or 50-70 mesh, depending on the particular size and distribution of formation solids to be screened out by the consolidated proppant particles. The proppant particles have a specific gravity in the range of from about 0.5 to 5, alternatively 1 to 4, alternatively 2 to 3, encompassing any value and subset therebetween.

In some cases, the proppants may also serve as part of the binding composition as the aluminosilicate source. For instance, the proppant might comprise common sand composed of quartz, a source of silicon oxide that may be part of the binding composition. For instance, fly ash may serve as both a proppant and an aluminosilicate source. In such case the amount of aluminosilicate source may be varied with respect to the relative amounts of metal silicate and alkali metal activator such that a portion remains as proppant and another portion undergoes a strength-hardening process as part of the binding composition. In such case the proppants may be microproppants or microspheres that may have a D50 particle size smaller than 100 mesh (149 μm), and in certain instances equal to or smaller than 200 mesh (74 μm), 230 mesh (63 μm) or even 325 mesh (44 μm). Microproppants or microspheres may have a D50 particle size ranging from 325 mesh (5 μm) to 100 mesh (149 μm). Exemplary commercially available microproppants include silica fine particulates, fly ash particles.

Blending/Mixing

The binding composition may be mixed with proppant to form a treatment fluid (such as a fracturing fluid) and injected into a wellbore. Conventional mixing equipment may be employed to form a slurry and/or the binding composition can be sprayed onto the proppant. Such processes may include a spray coater, wurster coater, a spray coater using a pluviation mechanism, or other such fluidized bed coater. The binding composition can be pre-made off-site or alternatively prepared on-site, and/or just prior to mixing with proppant. However, when mixed off-site the binding composition may begin to cure before reaching the site. Accordingly, it may be beneficial to prepare the binding composition on-site. All the components may be mixed simultaneously. Further, the binding composition and its blending with the proppant may be conducted on-the-fly. On-the-fly includes continuous or semi-continuous process where the components are continually mixed and injected into the wellbore, or injected as fluid packets between other fluids or spacer fluid packets downhole. On-the-fly processes may increase productivity, economy, and ease with which the treatment fluid is prepared and injected into the borehole. For instance the properties of the final product may be adjusted to meet current demand, such coating or aggregate might be applied to a proppant to create higher conductivity in a formation with at least 8,000 psi closure pressure while at a thicker coating of the same or another composite might allow the coated sand substrate to survive at pressures of at least 15,000 psi. Accordingly, the coating or aggregate of the strength-hardened composition may withstand at least 8,000 psi, alternatively at least 10,000, psi, alternatively, at least 12,000 psi, alternatively at least 15,000 psi, while maintaining conductivity, and fractures and pores open. The strength-hardened composition provides good conductivity even in the presence of high closure stresses. The conductivity may range from 220,000 to 600,000 mD-ft in the presence of closure stress of from 6,000 to 14,000 psi. The conductivity may range from 150,000 to 300,000 at a closure stress of 8,000 psi, alternatively from 180,000 to 250,000 mD-ft at a closure stress of 8,000 psi, alternatively from 190,000 to 210,000 mD-ft at a closure stress of 8,000 psi, encompassing any value and subset therebetween.

In terms of properties, the strength-hardened composition particulate or aggregate may be characterized according to the unconfined compressive strength (UCS) standard, in accordance with ASTM D7012. The UCS may be 2,000 psi or more, alternatively, 2,500 psi or more, alternatively, 3,000 psi or more, alternatively, 3,500 psi or more, encompassing any value and subset therebetween.

Proppants can be mixed with the binding composition in a range of from about 0.06% to about 120%, or alternatively from about 1 to about 15% weight/volume (e.g., g/100 ml). Proppants may be present in an amount in the range of from a lower limit of about 0.06%, 1%, 10%, 20%, 25%, 30%, 40%, 50%, to an upper limit of about 120.0%, 100.0%, 80.0%, 75.0%, 70.0%, 60.0%, %, 50%, 40%, 30%, 20%, 15.0 and 7.0% in weight/volume (e.g., g/100 ml), encompassing any value and subset therebetween.

Depending on the relative amounts of the components of the binding composition and the proppant, a coating of the binding composition on a proppant surface may form into a coated proppant particle or particulate, or alternatively, the binding composition may form an aggregate with a plurality of proppants blended with. The coated proppant particle may be distinct particles, whereas the aggregate composition with the plurality of particles may not be distinct particles, but may be contained in a continuous or discontinuous strength-hardened composition which connects or contains the plurality of proppant particles, clusters, flocs or other aggregates of proppants. The binding composition when added in relatively smaller amounts to the proppant amount may solidify to form a strong shell around the proppant particle, thus forming a strengthened proppant particulate. When the binding composition is added in relative larger amounts compared to the proppant amount, the binding composition will form an aggregate with the proppant. Accordingly, an operator may vary the relative amount of binding composition to proppant to form a particulate or aggregate in treatment fluid. Particulates may form when the ratio of binding composition amount to the proppant amount is 1:100, 1:50, 1:25, 1:20, 1:10, or any ration between 1:100 to 1:10. Aggregates may form when the ratio of binding composition amount to the proppant amount is 1:10, 1:8, 1:5, 1:4, 1:2, 1:1, 2:1, 4:1 5:1, 10:1, and 100:1.

When the proppant also serves as the aluminosilicate source, a portion may serve as the aluminosilicate source while the remaining portion serve as the proppant. For instance, from about 10% to about 90%, alternatively from about 20% to about 80%, from about 40% to about 60% of the proppant, encompassing any value and subset therebetween, may serve as the aluminosilicate source.

Illustrations

The exemplary methods and compositions disclosed herein may directly or indirectly affect one or more components or pieces of equipment associated with the preparation, delivery, recapture, recycling, reuse, and/or disposal of the disclosed compositions. The binding composition and treatment fluid of the present disclosure can be employed in a wide variety of oil and gas and downhole applications, for example, as a fracturing fluid. Although in the following figures and description, a fracturing process is described, the use of the presently disclosed composition is not limited to these applications but can be used in a wide variety of applications.

Figure 2:
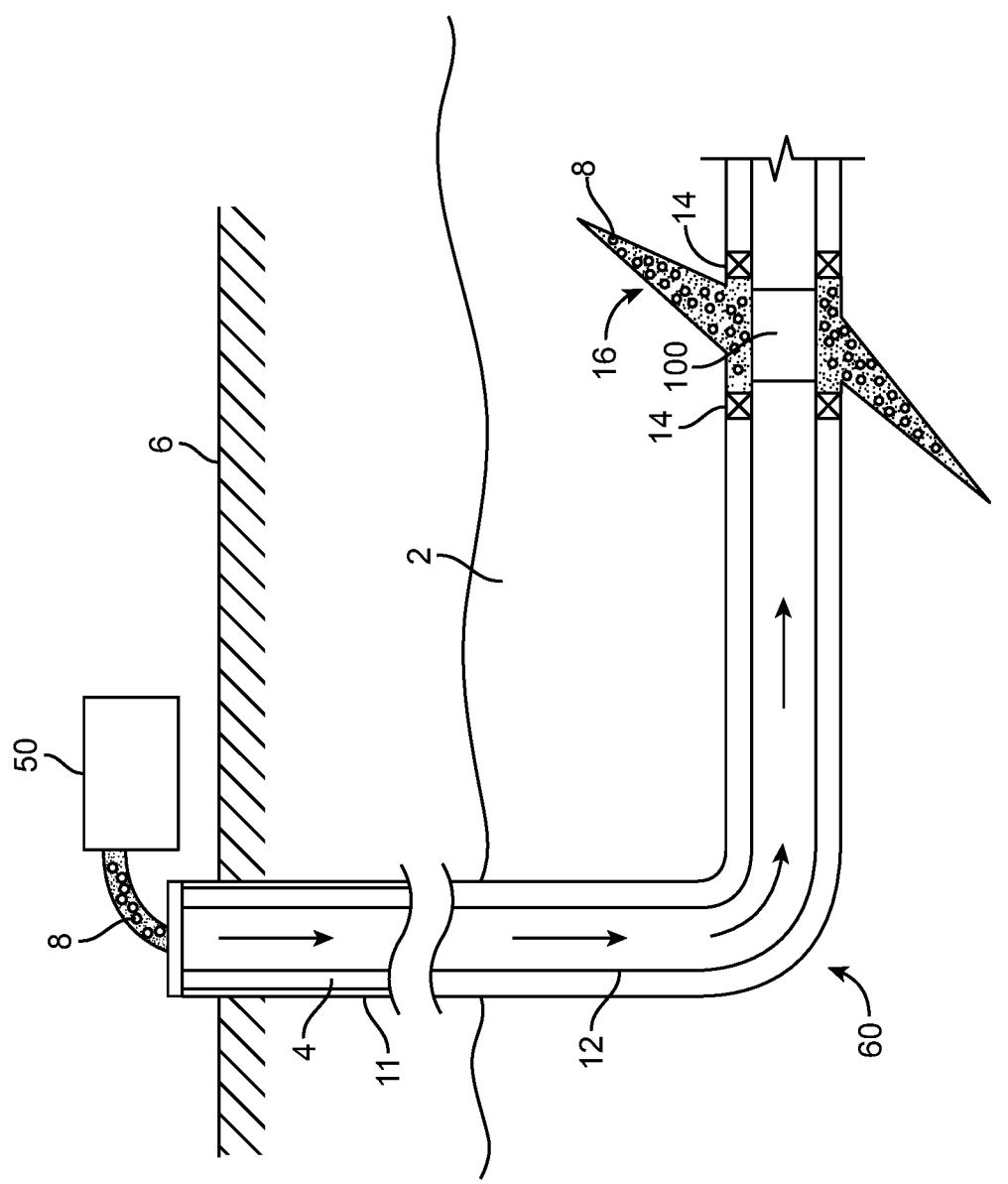
FIG. 2 is a diagram illustrating an example of a subterranean formation in which a fracturing operation may be performed in association with certain aspects of the present disclosure.

An exemplary fracturing system is illustrated in FIGS. 1 and 2. In this example, the system 10 includes a carrier composition, such as binding composition producing apparatus 20, a fluid source 30, a proppant source 40, and a pump and blender system 50 and resides at the surface at a well site where a well 60 is located. The fluid source 30 may include the aqueous base fluid as disclosed herein. In certain instances, the binding composition producing apparatus 20 combines the various components to form the binding composition disclosed herein.

To prepare the binding composition, an aluminosilicate source may be provided from container 70 and the metal silicate from container 75. An alkali metal activator can also be provided from alkali metal activator source 80. These can be combined together with the aqueous base fluid from fluid source 30 in the binding composition producing apparatus 20. In certain instances, the other components may be added such as a hydrocarbon fluid, a polymer gel, foam, air, nanoparticles, breakers, breaker, wet gases and/or other fluids and additives.

The pump and blender system 50 receives the binding composition and combines it with other components, including proppant from the proppant source 40 to form a treatment fluid, namely a fracturing fluid. The resulting mixture may be pumped down the well 60 and out through a downhole tool, such as tool 100 shown in FIG. 2, or through perforations or apertures of a casing or tubing, under a pressure sufficient to create or enhance one or more fractures in a subterranean zone, for example, to stimulate production of fluids from the zone. Notably, in certain instances, the binding composition producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can prepare and distribute the fracturing fluid to the target subterranean zone.

FIG. 2 illustrates a fracturing operation being performed on a portion of a subterranean formation of interest 2 surrounding a well bore 4 at well 60. The well bore 4 extends from the surface 6, and the fracturing fluid 8 is applied to a portion of the subterranean formation 2 surrounding the horizontal portion of the well bore through, for example, a downhole tool 100. The tool 100 can include ports, holes, or a sleeve which permits exit of fluid from the work string 12. Alternative to the tool 100, the fracturing fluid 8 may be applied via perforations or other apertures in a casing 11 (when the casing extends that far), work string 12, other piping, or merely directly into the formation. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. In cased wells, perforations can be formed using shape charges, a perforating gun, hydro-jetting, and/or other tools.

The well is shown with a work string 12 depending from the surface 6 into the well bore 4. The pump and blender system 50 is coupled to the work string 12 to pump the fracturing fluid 8 into the well bore 4. The work string 12 may include coiled tubing, jointed pipe, and/or other structures that allow fluid to flow into the well bore 4. The work string 12 can include flow control devices that control the flow of fluid from the interior of the work string 12 into the subterranean zone 2.

The work string 12 and/or the well bore 4 may include one or more sets of packers 14 that seal the annulus between the work string 12 and well bore 4 to define an interval of the well bore 4 into which the fracturing fluid 8 will be pumped. FIG. 2 shows two packers 14, one defining an uphole boundary of the interval and one defining the downhole end of the interval. When the fracturing fluid 8 is introduced into well bore 4 at a sufficient hydraulic pressure, one or more fractures 16 may be created in the subterranean zone 2. The proppant particulates in the fracturing fluid 8 may enter the fractures 16 where they may remain after the fracturing fluid flows out of the well bore. These proppant particulates may "prop" fractures 16 such that fluids may flow more freely through the fractures 16.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLE

The binding material for formation of the geopolymer includes the mixing of 18.6 g of Zeospheres® N-600 ceramic microspheres (a type of fly-ash), mixed with 13.4 g of Econolite™ additive (Sodium Metasilicate) sold by Halliburton Energy Services, Inc., and 10 ml MO-67™ also sold by Halliburton Energy Services, Inc. This composition was placed in an oven at 200° F. to cure the material. After 24 hours in the oven, the sample was pulled out and submitted to X-ray diffraction analysis. The results of the analysis are shown in Table 1 below and indicate the morphological make-up of the composition before and after curing.

Prior to curing, it was determined that the starting fly-ash material had 78% amorphous phase and 13% mullite. Once mixed to form the pre-cured composition, the ratios of the various phases were adjusted depending on the participating reactants, shown below.

TABLE I

| Material | Fly ash | Sodium Metasilicate | Pre-Cured Composition | Cured Composition | Compositional Change |
|---|---|---|---|---|---|
| Quantity (g) | 18.6% | 13.4% | | | |
| Amount (wt %) | 58% | 42% | | | |
| Amorphous | 78% | | 45.3% | 53% | +7.7% |
| Mullite | 13% | | 7.6% | 32% | +24.4% |
|  | 7% | | 4.1% | 8% | +3.9% |
| Natrite | | 12% | 5.0% | | |
| Hallite | | 1% | 0.4% | 6% | +5.6% |
| Sodium Silicate | | 87% | 36.4% | | |
| Calcite | | | | 1% | |
| Hematite | 2% | | 1.2% | | |

After curing the normalization was applied and it was determined that the morphologies of the strength-hardened composition had changed compared to the pre-cured composition. As shown above, the amorphous phase of the product had an increase in amorphous phase by 7.7%. Moreover, surprisingly, the Mullite crystalline phase increased by 24.4%. These morphological changes in composition, and in the crystalline phase, suggest that the curing process took place at a relatively low temperature of 200° F. Given that generally, in conventional compositions, such changes occur at higher temperatures of around 1,500° F., the result is highly advantageous. For instance, the curing can occur in lower temperature subterranean zones and boreholes, thereby facilitating on-the-fly methods.

The composition as above was prepared with 20-40 mesh sand as proppant. Subsequent strength-hardening, the conductivity was measured to be 196,770 mD-ft at a closure stress of 8,000 psi. The conductivity was measured according to API 19D, modified however, such that the flow rate was 200 ml/min, the duration of the experiment was 24 h, and the sample preparation was changed in terms of using only ¼ of the wafer surface area, and the sample was cured (i.e., strength-hardened) in a mold 24 hours prior to conducting the test. Accordingly, the strength-hardened composition provided a strength enhancing coating the proppant along with improved conductivity.

Further for the above the composition discussed in table 1 was measured to have a UCS of over 3,000 psi.

Numerous examples are provided herein to enhance understanding of the present disclosure. Statements of the disclosure include:

Statement 1: A method including injecting a treatment fluid into a borehole, the treatment fluid comprising a proppant and a binding composition, the binding composition having an aqueous base fluid, an aluminosilicate source, a metal silicate, and an alkali metal activator.

Statement 2: The method of statement 1, wherein the binding composition coats the proppant to form a coated proppant particulate upon strength-hardening.

Statement 3: The method of statement 1, wherein the binding composition forms an aggregate with the proppant.

Statement 4: The method of statement 1, wherein the binding composition strength-hardens in the presence of heat within the borehole.

Statement 5: The method of statement 1, wherein the strength-hardened binding composition proppant withstands at least 8,000 psi closure pressure.

Statement 6: The method of statement 1, wherein the aluminosilicate source is fly ash.

Statement 7: The method of statement 1, wherein the binding composition has a strength-hardening temperature of less than 400° F.

Statement 8: The method of statement 1, wherein the aluminosilicate source has an average particle size of less than 100 microns.

Statement 9: The method of statement 1, wherein the metal silicate is sodium metasilicate.

Statement 10: The method of statement 1, wherein alkali metal activator contains a metal selected from groups 1 or 2 of the periodic table.

Statement 11: The method of statement 1, wherein the alkali metal activator is an alkali metal carbonate or alkali metal hydroxide.

Statement 12: The method of statement 1, wherein the alkali metal activator is selected from the group consisting of KOH, K2CO3, NaOH, Na2CO3, Na2O, Ca(OH)2, KHCO3, NaHCO$_3$, KCl, NaCl, KF, NaF, MgCl2, and mixtures thereof.

Statement 13: The method of statement 1, wherein the alkali metal activator contains a counterion selected from at least one Na+, K+, Ca2+ and mixtures thereof.

Statement 14: The method of statement 1, wherein the proppant is different than the aluminosilicate source.

Statement 15: The method of statement 1, wherein the treatment fluid is injected downhole using one or more pumps.

Statement 16: A treatment fluid including a binding composition including an aqueous base fluid, an aluminosilicate source, a metal silicate, an alkali metal activator; and a proppant.

Statement 17: The treatment fluid of statement 16, wherein the binding composition coats the proppant to form a coated proppant particulate upon strength-hardening.

Statement 18: The treatment fluid of statement 16, wherein the binding composition forms an aggregate with the proppant.

Statement 19: The treatment fluid of statement 16, wherein the aluminosilicate source is fly ash.

Statement 20: The treatment fluid of statement 16, wherein the metal silicate is sodium metasilicate.

Statement 21: The treatment fluid of statement 16, wherein the alkali metal activator is an alkali metal carbonate or alkali metal hydroxide.

Statement 22: The treatment fluid of statement 16, alkali metal activator is selected from the group consisting of KOH, K2CO3, NaOH, Na2CO3, Na2O, Ca(OH)2, KHCO3, NaHCO$_3$, KCl, NaCl, KF, NaF, MgCl2, and mixtures thereof.

Statement 23: The treatment fluid of statement 16, wherein the alkali metal activator contains a counterion selected from Na+, K+, Ca2+ and mixtures thereof.

Statement 24: The treatment fluid of claim 16, wherein the proppant is different than the aluminosilicate source.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

The invention claimed is:

1. A method comprising:
    forming a curable binding composition comprising an aluminosilicate, a metal silicate, an aqueous base fluid, and an alkali metal activator;
    spraying the curable binding composition onto a proppant to form an uncured coated aggregate;
    dispersing the uncured coated aggregate in a treatment fluid to form a slurry;
    pumping the slurry into a borehole, wherein the borehole has at least one fracture extending from the borehole into a subterranean formation, wherein the uncured coated aggregate in the slurry cures upon exposure to downhole temperatures within the subterranean formation thereby forming a cured hardened aggregate.

2. The method of claim 1 wherein the slurry coats the proppant to form a coated proppant particulate upon strength-hardening.

3. The method of claim 1, wherein the slurry forms an aggregate with the proppant.

4. The method of claim 1, wherein the cured coated proppant withstands at least 8,000 psi closure pressure.

5. The method of claim 1, wherein the aluminosilicate source is fly ash.

6. The method of claim 1, wherein the cured coated proppant has a strength-hardening temperature of less than 400° F.

7. The method of claim 1, wherein the aluminosilicate source has an average particle size of less than 100 microns.

8. The method of claim 1, wherein the metal silicate is sodium metasilicate.

9. The method of claim 1, wherein alkali metal activator contains a metal selected from groups 1 or 2 of the periodic table.

10. The method of claim 1, wherein the alkali metal activator is an alkali metal hydroxide.

11. The method of claim 1, alkali metal activator is selected from the group of KOH, NaOH, Ca(OH)$_2$, KF, NaF, and mixtures thereof.

12. The method of claim 1, wherein the alkali metal activator is selected from KOH or Ca(OH)$_2$, and mixtures thereof.

13. The method of claim 1, wherein the proppant is different than the aluminosilicate source.

14. The method of claim 13, wherein the treatment fluid is injected downhole using one or more pumps.

15. The method of claim 1, wherein the aluminosilicate, metal silicate and the alkali metal activator initiate a geopolymer formation in the slurry.

16. The method of claim 1, alkali metal activator is selected from the group of KOH, NaOH, Ca(OH)2, KF, NaF, and mixtures thereof.

17. The method of claim 1, wherein the cured hardened aggregate is operable to withstand at least 8,000 psi while maintaining conductivity, and fractures and pores open.

18. The method of claim 1, wherein the spraying of the curable binding composition onto the proppant includes controlling an amount of the curable binding composition so as to form a shell around the proppant.

19. The method of claim 1, wherein the spraying the curable binding composition onto a proppant is performed prior to being disposed in the borehole.

20. The method of claim 1, wherein the proppant includes sand.

* * * * *